United States Patent [19]

Hsu

[11] Patent Number: 4,853,100
[45] Date of Patent: Aug. 1, 1989

[54] HIGH PERFORMANCE ELECTROCHEMICAL ENERGY CONVERSION SYSTEMS

[76] Inventor: Michael S. Hsu, Roundhill Rd., Lincoln, Mass. 01773

[21] Appl. No.: 142,067

[22] Filed: Jan. 11, 1988

Related U.S. Application Data

[63] Continuation-in-part of Ser. No. 861,433, May 9, 1986, Pat. No. 4,721,556, which is a continuation-in-part of Ser. No. 735,441, May 17, 1985, Pat. No. 4,629,537.

[51] Int. Cl.⁴ .......................... C25B 9/00; H01M 8/04
[52] U.S. Cl. .................................. 204/256; 204/258; 204/262; 204/279; 429/26
[58] Field of Search ............................. 204/253-258, 204/267-270, 279, 262; 429/34-37, 26; 156/89; 428/65, 167, 446; 29/623.1

[56] References Cited

U.S. PATENT DOCUMENTS

| | | | |
|---|---|---|---|
| 3,394,032 | 7/1968 | Dahner | 429/26 |
| 3,432,353 | 3/1969 | Von Krusenstierna et al. | 429/39 |
| 3,460,991 | 8/1969 | White | 429/30 |
| 3,505,114 | 4/1970 | Rohr | 429/32 |
| 3,526,548 | 9/1970 | Accorsi et al. | 429/38 X |
| 3,526,549 | 9/1970 | Archer et al. | 429/32 |
| 3,554,808 | 1/1970 | Fischer et al. | 429/32 |
| 3,607,427 | 9/1971 | White | 204/129 X |
| 3,616,334 | 10/1971 | Aker | 204/129 |
| 3,964,930 | 6/1976 | Reiser | 429/26 |
| 4,042,483 | 8/1977 | Bouy et al. | 204/290 F |
| 4,056,452 | 11/1977 | Campbell | 204/258 |
| 4,085,016 | 4/1978 | Janjua et al. | 204/262 X |
| 4,197,362 | 4/1980 | Schmidberger et al. | 429/12 |
| 4,210,512 | 7/1980 | Lawrance et al. | 204/257 |
| 4,310,605 | 1/1982 | Early et al. | 429/26 X |
| 4,478,918 | 10/1984 | Ueno et al. | 429/38 |
| 4,482,440 | 11/1984 | Kadija | 204/262 X |
| 4,490,444 | 12/1984 | Isenberg | 429/31 |
| 4,490,445 | 12/1984 | Hsu | 429/32 |
| 4,574,112 | 3/1986 | Breault et al. | 429/26 |
| 4,583,583 | 4/1986 | Wittel | 429/26 X |
| 4,623,596 | 11/1986 | Kamoshita | 429/26 |
| 4,629,537 | 12/1986 | Hsu | 204/266 X |
| 4,721,556 | 1/1988 | Hsu | 204/258 |

Primary Examiner—Donald R. Valentine
Attorney, Agent, or Firm—Thomas J. Engellenner

[57] ABSTRACT

Thermal control in electrochemical energy conversion systems is achieved by the bulk integration of columnar electrochemical converter elements and heat transport elements. The heat transport elements are disposed between the columnar converter elements to form an inter-columnar array. Radiant heat transfer provides the heat exchange between the converter columns and the heat transport elements.

21 Claims, 7 Drawing Sheets

HIGH PERFORMANCE ELECTROCHEMICAL ENERGY CONVERSION SYSTEMS

REFERENCE TO RELATED APPLICATIONS

This application is a continuation-in-part of application Ser. No. 861,443 filed May 9, 1986, now U.S. Pat. No. 4,721,556, which is a continuation-in-part of application Ser. No. 735,441 filed May 17, 1985, now U.S. Pat. No. 4,629,537.

BACKGROUND OF THE INVENTION

This invention relates to electrochemical converters and improved methods for making the same, as well as high performance systems employing such devices and methods.

Electrochemical converters perform fuel-to-electricity conversions in a fuel cell (electric generator) mode or electricity-to-fuel conversions in an electrolyzer (fuel synthesizer) mode. The converters are capable of high efficiencies, depending only on the relation between the free energy and enthalpy of the electrochemical reaction, and are not limited by Carnot-cycle considerations.

The key components in an electrochemical energy converter are a series of electrolyte units onto which electrodes are applied and a similar series of interconnectors disposed between the electrolyte units to provide serial electrical connections. Each electrolyte unit is an ionic conductor with low ionic resistance allowing the transport of an ionic species from one electrode-electrolyte interface to the opposite electrode-electrolyte interface under the operating conditions of the converter. Various electrolytes can used in such converters. For example, zirconia stabilized with such compounds as magnesia, calcia or yttria can satisfy these requirements when operating at an elevated temperature (typically around 1000° C.). The electrolyte material utilizes oxygen ions to carry electrical current. The electrolyte should not be conductive to electrons which can cause a short-circuit of the converter. On the other hand, the interconnector must be a good electronic conductor. The interaction of the reacting gas, electrode and electrolyte occurs at the electrode-electrolyte interface which requires the electrodes be sufficiently porous to admit the reacting gas species and to permit exit of product species.

The approach of forming electrolyte and interconnector components as free-standing plates was disclosed by the present inventor in U.S. Pat. No. 4,490,445, issued Dec. 25, 1984, herein incorporated by reference. However, during operation, the stacks of electrolyte and interconnector plates can experience thermal non-equilibrium. It is important to reduce thermal gradients across the converter assembly by facilitating the heat transfer to and from the electrolyte elements.

When an electrochemical converter performs fuel-to-electricity conversion in a fuel cell mode, waste energy must be removed from the electrolyte surfaces. Conversely, when the converter performs electricty-to fuel conversion in the electrolyzer mode, the electrolyte must be provided with heat to maintain its reaction. In the past, heat exchanging has been achieved primarily by the convective heat transfer capabilities of the gaseous reactants as they travel through the assembly. Such reliance on the heat capacity of the reactants creates an inherent thermal gradient in the system resulting in non-optimum electrochemical processes.

There exists a need for better thermal control mechanisms within electrochemical energy systems. In particular, an electrochemical energy conversion system, having the capability of regulating the operating temperature and equilibrating the temperature within the assembly, would represent a major improvement in the industry.

SUMMARY OF THE INVENTION

Highly effective thermal control in electrochemical energy conversion systems can be achieved by the bulk intergration of columnar electrochemical converter elements and heat transport elements. The heat transport elements are disposed between the columnar converter elements to form an inter-columnar array. Radiant heat transfer provides the heat exchange between the converter columns and the heat transport elements.

The heat transport elements of the present invention can be heat pipes. The heat pipe is constructed to provide an exceptional degree of heat transport capability. In one preferred embodiment, the heat pipe can comprise a tubular metal structure with hollow walls, having a network of passageways or "wicks", through which pass a fluid medium, such as sodium or lithium, to conduct heat quickly from one portion to another and, thus, maintain a uniformity of temperature in the heat pipe overall. In operation, the medium is nominally liquid and is evaporated where a hot spot occurs. The medium travels to a cooler portion of the pipe and condenses. Rapid heat transfer is accomplished by the circulation of the medium with high latent heat associated with the changing of its physical state.

Alternatively, the heat transport elements can be simple conduits for an active heat transfer medium, such as water, steam, carbon dioxide or a fluorocarbon. The medium can be a gas, a liquid, or a two-phase fluid. Regardless of the type of transfer medium, the heat transport elements are preferably integrated or interdigitated with the columnar converter elements.

The electrochemical converter elements of the system can be formed from thin structural components designed to optimize conversion efficiency. Preferably, thin plates of the electrolytes and interconnectors are used. Plasma-spray techniques can be used to produce straight, free-standing, thin electrolyte plates, as described in more detail in co-pending, commonly owned U.S. Ser. No. 861,433 herein incorporated by reference. Alternatively, wafer processing techniques, as described below, can be employed to construct the electrolyte plates.

Interconnector plates with corrugated patterns, providing passages for the distribution of reactants, can form the other component of the converter stacks. The plates preferably are fabricated from materials that optimize the weight and cost requirements. Ease of manufacturing, together with high strength and good chemical resistance at high temperatures, characterize the preferred interconnector materials. Metallic alloy sheets of about 100 to 500 microns have been found suitable. Suitable alloys include nickel alloys, nickel-chromium alloys, nickel-chromium-iron alloys, iron-chromium-aluminum alloys, and cermets of such alloys and refractory compounds, such as alumina or zirconia.

To assure the electrical continuity of the interconnector in high temperature oxidizing environments, thin coatings (i.e., 10 microns or less) of gold, silver or platinum are preferred on the contact points when metallic alloys are used. High temperature and long duration tests have demonstrated the durability and stability of such contact coatings. Stamping or deposition techniques can be employed to form the corrugated patterns of the interconnector plates.

Silicon carbide and molybdenum disilicide are also attractive materials for construction of the interconnector plates. Silicon carbide has a very low specific density of about 3.1 g/cm$^3$ and very low hydrogen permeability. Silicon carbide or molybdenum disilicide plates of about 50 to 300 microns thickness have been found suitable. Platinum alloys have also been found to be strong and non-reactive in the operating temperature range. Platinum alloy sheets of about 50 to 250 microns thickness have been found suitable in terms of thermal/mechanical and permeation criteria.

The electrochemical converter stacks can be paired to form hairpin pendants with U-bend connectors to achieve better structural rigidity and more convenient one-sided terminations for gas manifolding and electrical connections. Bus bars are provided to tap or supply electricity to the electrochemical pendants in multiple parallel connections. A heat exchanger can also be provided to serve as a thermal conduction buffer and preheat incoming gasses with a counter flow scheme.

The energy systems disclosed herein can be used in various systems to generate electricity in conjunction with other thermodynamic processes. In one illustrated embodiment, fuel cells can be employed in a co-generation system to generate electricity within a modified industrial steam boiler. In another illustrated embodiment, a space power system is disclosed utilizing an electrochemical-loop formed by a high-temperature electrolytic cell and a low temperature fuel cell.

The invention will next be described in connection with certain perferred embodiments. However, it should be clear that various changes and modifications can be made by those skilled in the art without departing from the spirit or scope of the invention. For example, various configurations of converters and heat transport elements can be employed to achieved bulk integration. Moreover, although the converter stacks and heat transport elements are shown in a schematic round, columnar configurations, such components can also have a square or rectangular outer shape. Additionally, other materials which have good ionic transport properties can be used in lieu of zirconia to form the electrolyte plates and the patterns formed in interconnector plates can be continuous ridges or discontinuous protrusions.

DETAILED DESCRIPTION

Figure 1:
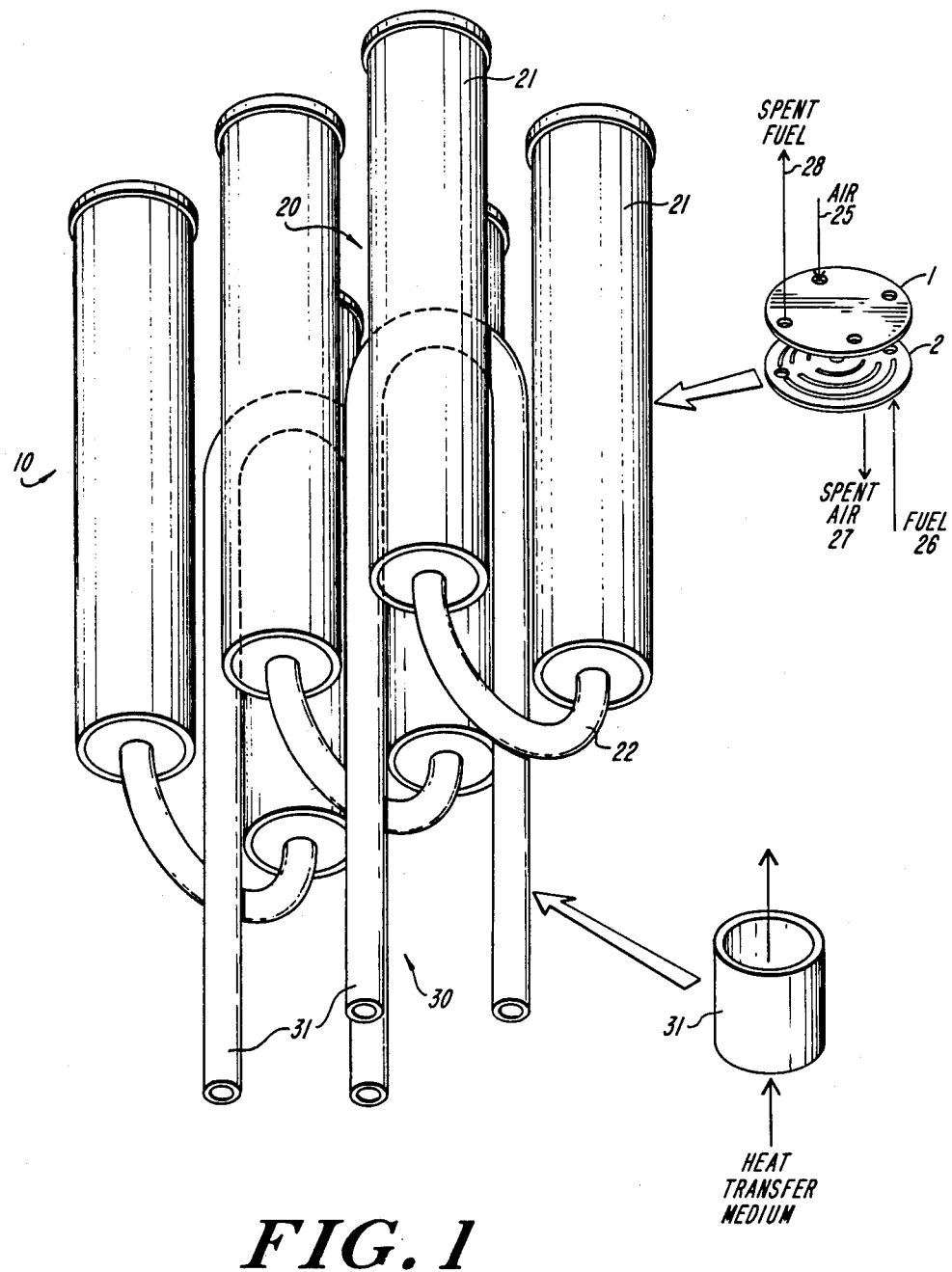
FIG. 1 is a simpified isometric view of an electrochemical energy system employing columnar electrochemical converter elements and heat transport elements according to the invention.

In FIG. 1, an electrochemical energy conversion system 10, according to the present invention, is shown consisting of an electrochemical converter assembly 20 and a heat transport assembly 30. The converter assembly 20 is formed by columnar elements 21 joined by U-bend connectors 22. The columnar elements consist of alternating electrolyte plates 1 and interconnector plates 2. Holes through the plates 1 and 2 form the passages for fuel and oxidizer gases. Grooves in the interconnector plates 2 facilitate the distribution and collection of the gases.

The heat transport assembly 30 serves to facilitate the removal or addition of thermal energy to the converter elements 21. The bulk integration of converter elements 21 and heat transport elements 31 is achieved by alternating the elements 21 and 31 in an interdigitated array, as described in more detail below. The heat transfer between the elements 21 and 31 primarily relies upon thermal radiation. The radiative thermal coupling is capable of high heat flux. It offers mechanical decoupling, and thus relaxes constraints in design and material selections of the heat transport elements. Additionally, the array pattern of a bulk integration provides better temperature uniformity among the electrochemical converters resulting in optimal system performance.

In lieu of heat pipes as the heat transport element 31, the heat transport assembly 30 can employ conventional pipes carrying a coolant or heating medium.

For example, in heat dissipating operations, water can be carried in elements 31. Heat transfer from the converter elements 21 to the heat transport elements 31 primarily relies upon thermal radiation from the converters 21. The converter stack temperature can be regulated by the selection of the ratio of the stack external surface to the external surface of elements 31, which serve as heat sinks. Their temperature can be maintained by the pressure in a boiler (not shown) according to saturation property of water. For example, a 190 psi steam corresponds to 164° C. steam temperature . This assembly has been found to provide good design sensitivity and operational stability. The system will deliver steam at a quantity directly related to the heat rejection by the fuel cells. A change of the heat rejection will not affect the operating temperature of the fuel cell stack.

The advantages of this radiation-coupled cooling approach are as follows: (1) the fuel cell assembly and the coolant circuit are constructed independently and can be separately serviced; (2) reactant flow requirements can be determined solely on the fuel cell performance rather than cooling needs; (3) steam is generated directly, and the temperature can be easily selected by changing the pressure setting in the boiler; and (4) radiation heat transfer helps to maintain a uniform temperature distribution over cell stack. In various applications, the heat transport fluid can be water, saturated steam, superheated steam, gas, or a variety of two-phase fluids.

Figure 2:
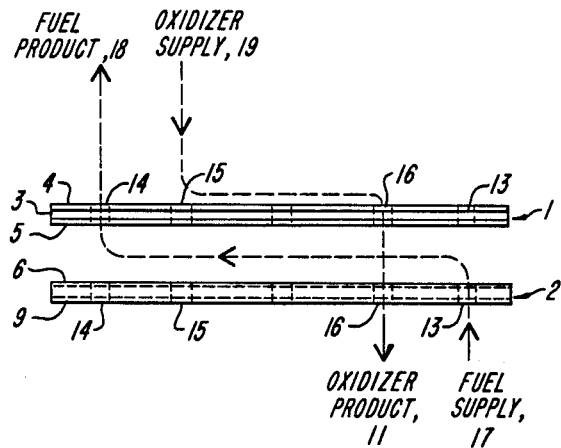
FIG. 2 is an expanded side view of an electrolyte component and an interconnector component of an individual converter element of FIG. 1.
Figure 3:
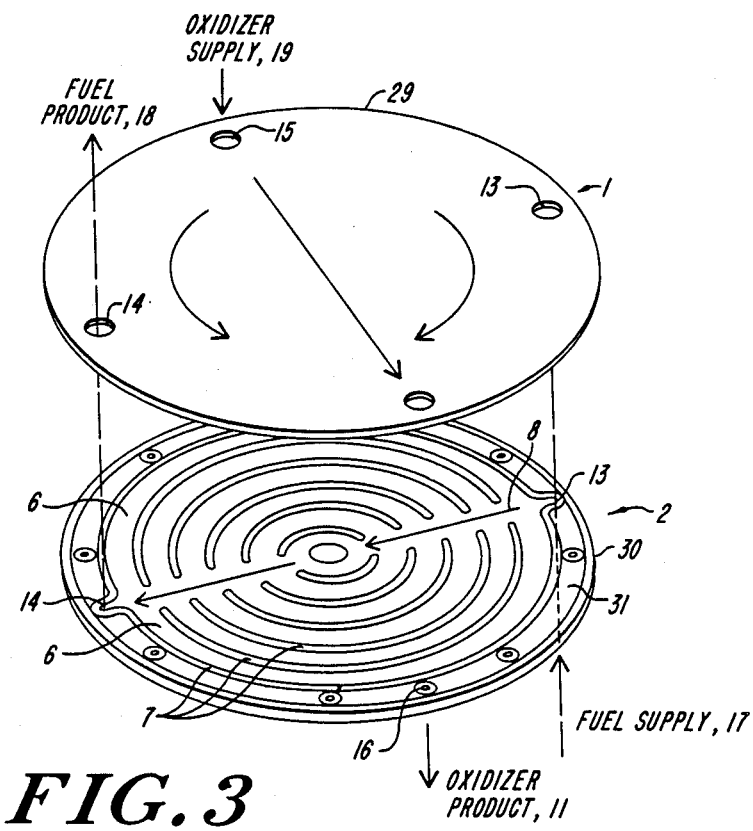
FIG. 3 is an isometric view of the electrolyte and interconnector components of FIG. 2.

In FIGS. 2 and 3, the basic cell unit in the electrochemical cell stack is shown comprising a single electrolyte plate 1, and a single interconnector plate 2. In one embodiment, the electrolyte plate 1 can be made of stabilized zirconia $ZrO_2\cdot(Y_2O_3)$ material 3, on which a porous oxidizer electrode 4 and a porous fuel electrode 5 are coated. Exemplary materials for the oxidizer electrodes are perovskites such as $LaMnO_3(Sr)$. Preferred materials for fuel electrodes are cermets such as $ZrO_2/Ni$. The interconnector plate 2 preferably is made of a metal such as Inconel, a nickel alloy or a platinum alloy or made of a non-metallic conductor, such as silicon carbide. The interconnector plate 2 serves as the electric connector between adjacent electrolyte plates and as a partition between the fuel and oxidizer gases as well as providing a heat conduction path along the electrode surfaces 4, 5 and to the outer edges of the plates 1 and 2.

Fuel can be supplied to the cell stack through an axial (with respect to the stack) manifold 17 coupled to the stack via holes 13 and the fuel product is exhausted through manifold 18 via holes 14. The fuel is distributed over the fuel electrode surface 5 through an in-plane groove network 6 formed in the upper surface of the interconnector plate 2. The notches 8 made in ridges 7 provide openings into the groove network 6 connecting holes 13 and 14 at the surface of each fuel electrode 5. The oxidizer is fed to the stack from manifold 19 via holes 15 and its product is exhausted through manifold 20 via holes 16. The oxidizer is distributed over the oxidizer electrode surface of the next electrolyte plate through a complementary in-plane groove network 9 formed in the lower surface of the conductor plate 2. A similar network on the lower surface of the adjacent cell above provides the passages for the oxidizer along electrolyte plate 1 as shown in FIG. 3. The outer ridges of the groove networks 6 and 9 on the interconnector plates 2 are brought in contact with electrolyte plates 1 to form the sealed outer walls of stack assembly. The ridges 7 are pressed against the electrodes in assembly to achieve electrical contacts. The stack can be secured by tension rods (not shown).

It is to be understood that the apparatus related to this invention can be utilized as a fuel cell (electric generator) when gaseous fuel is supplied or be applied as an electrolyzer (fuel synthesizer) when electricity is applied. For example, it is applicable to all reversible reactions involving exchanging of oxygen such as:

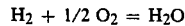
$$H_2 + 1/2\ O_2 = H_2O$$

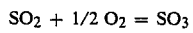
$$SO_2 + 1/2\ O_2 = SO_3$$

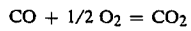
$$CO + 1/2\ O_2 = CO_2$$

and

$$NH_3 + 5/4\ O_2 = NO + 3/2\ H_2O$$

The thin electrolyte plates of this invention can be prepared using a high energy plasma-spray technique. For example, a powder comprising zirconia stabilized with magnesia, calcia or yttria is first suspended in a working gas such as nitrogen or argon and the suspension then is passed through an arc discharge. The oxide particles are heated by the discharged gas to their molten state and ejected from a nozzle onto a substrate, which has a surface corresponding to the desired configuration of the final electrolyte plate. The arc discharge is typically at least about 30 kilowatts, preferably at least 50 kilowatts to generate a high energy plasma spray.

Alternatively, electrolyte plates can be produced from slices of bulk electrolyte materials. For example, a high density cylindrical block of a solid oxide material (e.g. zirconia with yttria doping) can be formed by slip casting, followed by a slow sintering cycle to yield a dimensionally-stable, stress-free block. A thin electrolyte plate or membrane can then be obtained by precision slicing of the block, for example, by using an inner diameter annular blade machine (such as the I.D. Slider System manufactured by Silicon Technology Corporation). The blade stability in such machines can yield plates ranges from about 100 to 200 microns. The plates can then be lapped to its final thickness and laser trimmed to the final pattern.

Other materials can also be substituted for solid oxide in the fabrication of electrolyte plates. Such materials include solid state anion conductors and solid state proton conductors. Additionally, other oxygen ion transporting materials, such as molten carbonate on a solid carrier can also serve as electrolyte plates. These materials may be useful in particular applications where lower operating temperatures (e.g., about 500° C. to about 850° C.) are desired.

A wide variety of conductive materials can be used for the thin interconnector plates of this invention. Such materials should meet the following requirements: (1) high strength, as well as electrical and thermal conductivity; (2) good oxidation resistance up to the working temperature; (3) chemical stability with fuel species; and (4) manufacturing economy when formed into the corrugated plate configuration.

The suitable materials for interconnector fabrication include nickel alloys, nickel-chromium alloys, nickel-chromium-iron alloys, iron-chromium-aluminum alloys, platinum alloys, cermets of such alloys and refractory material, such as zirconia or alumina, silicon carbide and molybdenum disilicide.

The corrugated top and bottom patterns of the interconnectors can be obtained. For example, by stamping the metallic alloy sheets with one or more sets of matched male and female dies. The dies are prefabricated according to the desired configuration of the product, and can be hardened by heat treatment to withstand the repetitive compressing actions in mass productions. The stamp forming process for the interconnectors preferably is conducted in multiple steps due to the geometrical complexity of the gas passage networks. For example, grooves are formed in initial strokes, which are followed by notch forming to provide gas cross-flow passages. Holes in the interconnectors are punched out at the final step. Temperature annealling is recommended between the consecutive steps to prevent the overstressing of sheet metal. The stamping method is capable of producing articles of complex geometry while maintaining uniform material thickness. Alternatively, corrugated interconnectors can be formed by electrodeposition on an initially flat metal plate using a set of suitable masks. Silicon carbide interconnector plates can be formed by vapor deposition onto preshaped substrates, by sintering of bonded powders, or by self-bonding processes.

Figure 4:
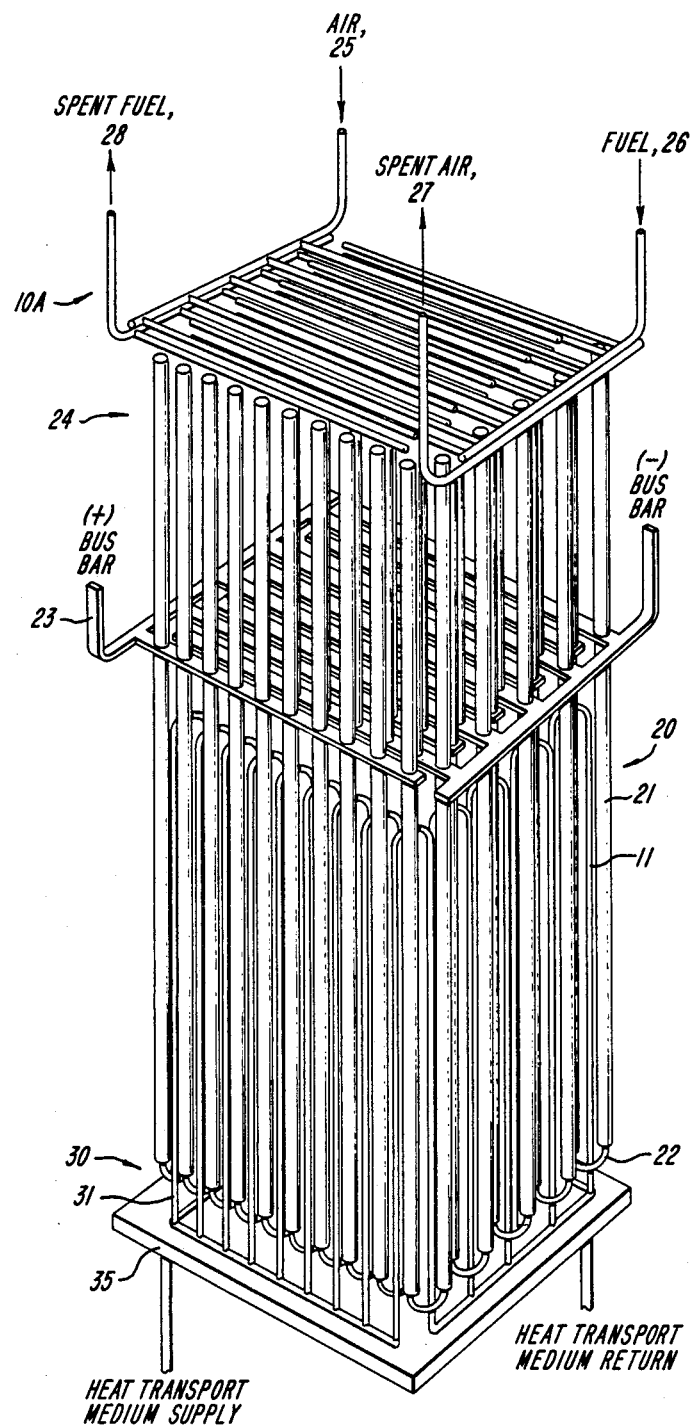
FIG. 4 is a more detailed isometric view of an electrochemical energy system according to the invention.

In FIG. 4, a more comprehensive illustration of the system 10A is shown having stacked electrolyte and interconnector plates as its components. In general, the structures of the converter elements are similar to those described in U.S. Pat. No. 4,490,445 cited above and incorporated by reference. The system 10A includes a converter assembly 20 having hairpin pendants 21 with U-bends 22 to achieve better structural rigidity and more convenient one-side terminations for gas manifolding and electrical connections. Bus bars 23 are provided to tap or supply electricity to the electrochemical pendant stacks 21 which are in multiple parallel electrical connection. The system 10A is designed to operate efficiently at an elevated temperature (for example, about 1,000 degrees C.). Heat exchanger stacks 24 are provided and serve as a thermal conduction buffer between the hot electrochemical cell stacks 21 and the incoming gases. In the illustrated embodiment, the incoming reaction gases are heated by the outgoing spent product gases in a counterflow scheme similar to that described in U.S. Pat. No. 4,490,445. The heat exchanger stack 24 can be constructed from flat heat exchanger plates which are arranged in alternating layers with partition plates. Internal passages for the feeding and exhausting of gases and grove networks for the distribution of gases over the heat exchanger plates can be provided substantially identical to the grove and ridge patterns described above in connection with the plates of the electrochemical converter. Similarly, ridges on the heated partition plates can be pressed against the adjacent heat exchanger plates to provide circumferential gas seals.

Also shown in FIG. 4 is an inter-columnar heat transport assembly 30 integrated with the converter assembly 20. The heat transport assembly 30 includes individual heat transport elements 31 (which carry the heat transport medium) and a manifold 35 which connects the individual elements 31 together. The manifold 35 can be connected to a radiator (not shown) for cooling operations or to a heat source (not shown) to accept heat energy and transfer such energy to the converter assemby 20.

Figure 5:
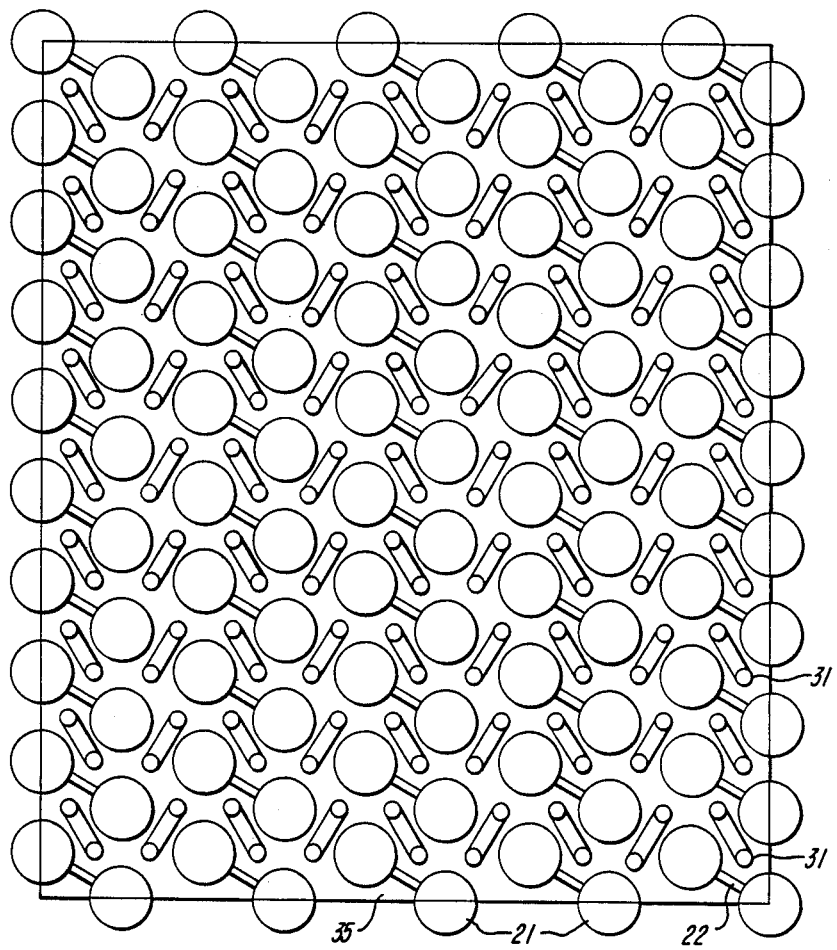
FIG. 5 is a cross-sectional view of the system of FIG. 2 showing the bulk integration of converter and heat transport elements.

FIG. 5 is a cross-sectional illustration of the system 10A of FIG. 4 shown the bulk integration of the converter and heat transport assemblies 20, 30. FIG. 5 shows the two-dimensional array of converter elements 21 (joined by U-bend connectors 22) and U-shaped heat transport elements 31.

Figure 6:
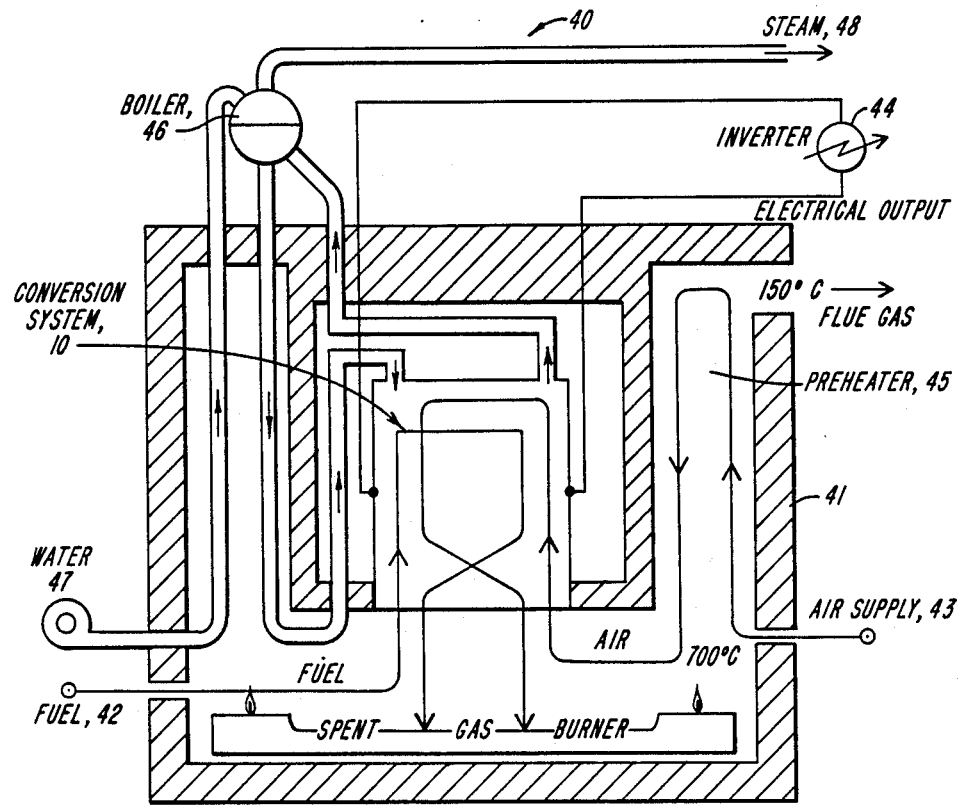
FIG. 6 is a schematic illustration of a co-generation application incorporation the electrochemical energy system of the present invention.

FIG. 6 shows a steam-cogeneration system 40 useful, for example, in generating steam for industrial or residential uses, from the heat dissipated from an electrochemical converter 10 within the thermal enclosure chamber 41. In this configuration, fuel supply 42 is first fed via heat exchangers into the converter 10 and air from air supply 43 is likewise fed through the exchangers into the converter 10. The electricity generated by the converter is converted to alternating current electrical output by inverter 44. In this cogeneration system 40 the converter produces electricity at about 1000° C. by an exothermic electrochemical process. In this system, the heat is radiantly transferred to the heat transport assembly 30. Steam is generated in the heat transport assembly 30 and collected in the boiler drum 46. The spent gases from the converter are also burned within the thermal enclosure 41 to provide additional energy necessary to generate further steam 48 from water 47. This steam can be used directly in industrial applications for various processes or can be used, for example, in residential or commercial applications for heating or the like.

Figure 7:
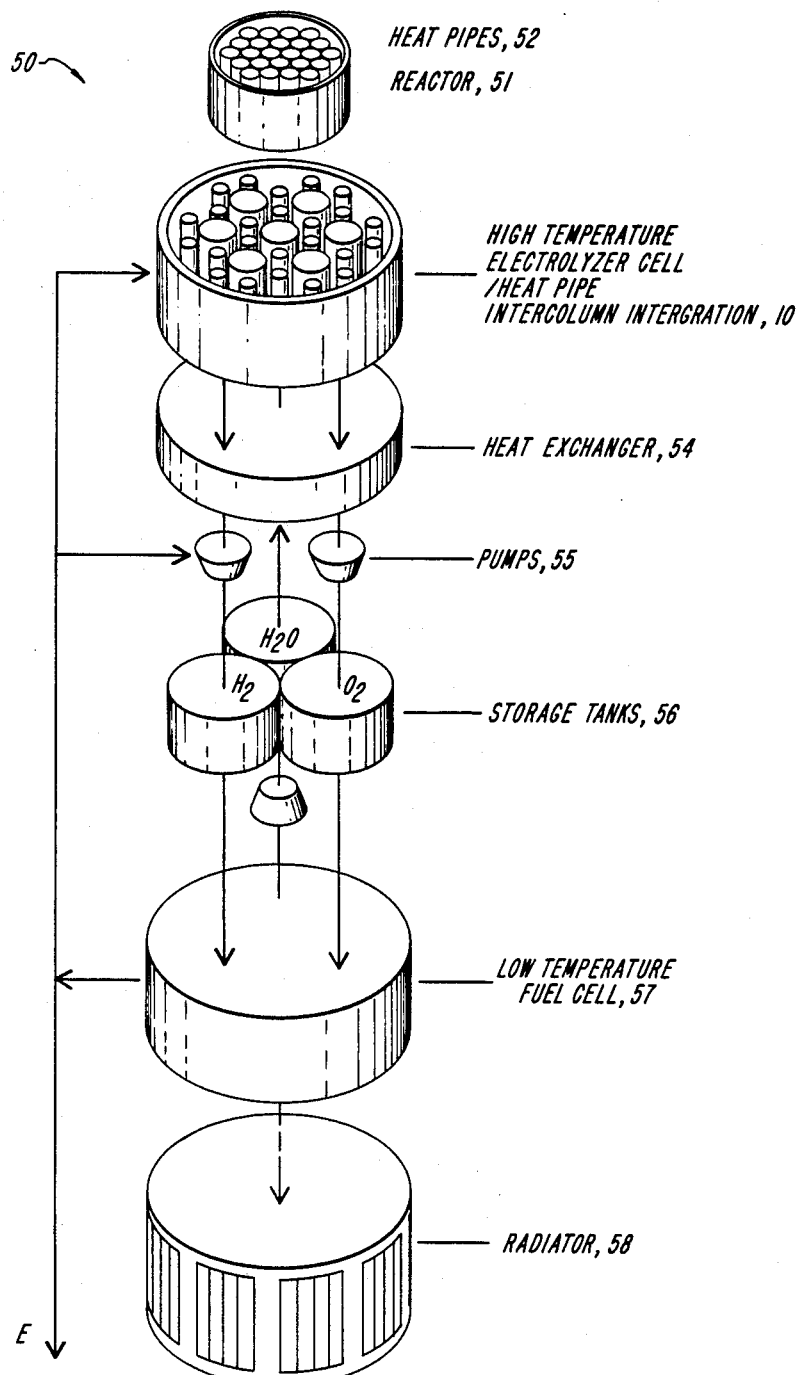
FIG. 7 is a schematic illustration of a space power application incorporating the electrochemical energy system of the present invention.

FIG. 7 illustrates a space power system 50, including a heat source 51 (which can be a nuclear reactor or a solar concentrator) and an electrochemical-loop comprising the converter 10 operating as an electrolyzer cell in conjunction with a fuel cell 57 which generates electricity. The reactor 51 is thermal coupled to converter 10 by heat pipes 52. Also shown in FIG. 7 are a heat exchanger 54 that conserves the sensible heat of the reactants, pumps 55, storage tanks 56 and a radiator 58 to cool the fuel cell.

In the electrolytic cell 10, a working fluid is electrolyzed using combined thermal and electrical input. The electrolysis products are recombined in a lower temperature fuel cell, generating more voltage output than required to operate the electrolytic cell. The net result is that the thermal energy is consumed and electricity is generated.

In space systems hydrogen and oxygen are the most commonly available reactants. The dissociation and recombination of water is thus selected as the baseline reaction in the electrochemical-loop. The working medium flows from the electrolytic cell to the fuel cell in separate channels as $O_2$ and as $H_2O(g)$ mixed with $H_2$. It flows from the fuel cell back to the electrolytic cell in a single channel as $H_2O(g)$ mixed with a smaller fraction of $H_2$.

As shown in FIG. 7, the electrolytic cell 10 can be thermally coupled to the heat source, e.g., a nuclear reactor using an out-of-core approach 52 that integrates the heat pipes or other heat-transport elements of converter 10 with the heat source 51. Within the converter 10, the inter-columnar array configuration permits uniform heat transfer by radiant energy coupling. This bulk integration permits not only efficient energy transfer but also economizes the volume required by the system 50.

Figure 8:
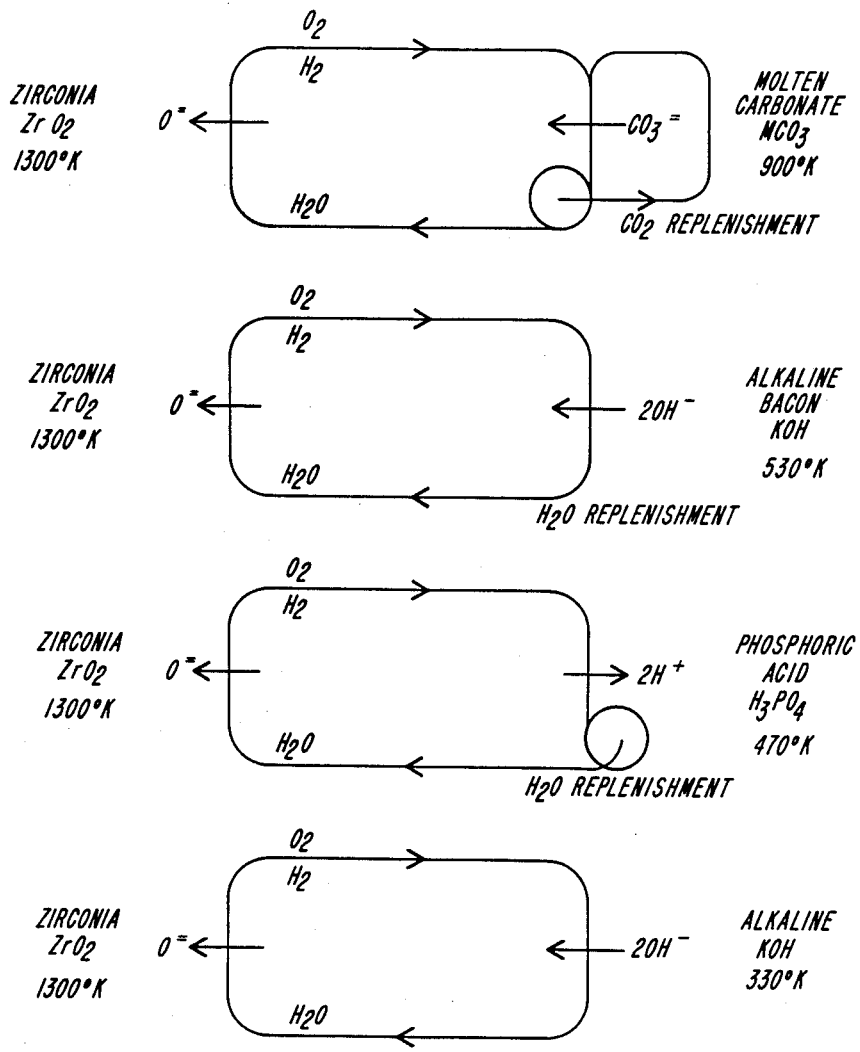
FIG. 8 is a schematic illustration of various configurations of an electrochemical-loop employing the energy systems of the present invention as electrolytic cells.

Zirconia solid oxide cells can be employed in the high temperature electrolyzer operating at 1300° K. For the low temperature component in the electrochemical-loop, several fuel cell options are available, such as molten carbonate fuel cells (900° K.), alkaline bacon fuel cells (530° K.), phosphoric acid fuel cells (470° K.), or alkaline fuel cells (330° K.). FIG. 8 is a schematic illustration of these four electrochemical-loop options. To satisfy the concentration balance under steady state operation, condensation of $H_2O$ is required in the molten carbonate fuel cell and phosphoric acid fuel cell operations to allow the separation and cross-resplenishment of $CO_2$, respectively. The efficiency of the loop is limited by the Carnot efficiency.

It appears that the nuclear/electrochemical-loop that uses a zirconia cell/phosphoric acid cell combination has the potential to offer a factor of 3 or greater in weight advantage over conventional nuclear/thermoelectric systems. Other combinations offer slightly less advantage, i.e., a factor of 2 to 3. When considering the storage capability of the electrochemical-loop, an additional weight advantage can be gained by optimizing the size of the heat source and the converter.

What is claimed is:

1. An electrochemical system, the system comprising: an electrochemical converter assembly having a plurality of columnar converter elements, each columnar element comprising a set of electrolyte plates having a fuel electrode material coated on one side and an oxidizer electrode material coated on the other side, and a set of interconnector plates to provide electrical contact with the electrode coatings of the electrolyte plates, as well as passages for the distribution of gases, wherein the columnar element is assembled by stacking alternating layers of electrolyte and interconnector plates and then joining said plates together at their peripheral edges to define a gas-tight assembly; and an inter-columnar heat transport assembly, having a plurality of integrated heat transport elements disposed between the elements of the converter assembly without contacting the converter elements to provide efficient temperature regulation by radiant heat transfer.

2. The system of claim 1 wherein the electrolyte plates of the columnar converter elements comprise a zirconia electrolyte.

3. The system of claim 1 wherein the electrolyte plates of the columnar converter elements are the products of plasma spray deposition.

4. The system of claim 1 wherein the electrolyte plates of the columnar converter elements are wafers sliced from a solid oxide block.

5. The system of claim 1 wherein the interconnector plates of the columnar converter elements comprises an electronically conductive material chosen from the group of nickel alloys, nickel-chromium alloys, nickel-chromium-iron alloys, iron-chromium-aluminum alloys, molybdenum alloys, platinum alloys, cermets of such alloys, silicon carbide, and molybdenum disilicide.

6. The system of claim 1 wherein the heat transport elements comprise pipes filled with a fluid to transport heat from one region of the assembly to another.

7. The system of claim 1 wherein the heat transport elements are integrated with the converter elements to form an interdigitated array of alternating elements.

8. The system of claim 1 wherein the heat transport elements are heat pipes having a wick structure and containing a working medium capable of undergoing phases changes in response to temperature conditions.

9. The system of claim 1 wherein the heat transport elements are tubing containing steam.

10. The system of claim 1 wherein the heat transport elements are tubing containing water.

11. The system of claim 1 wherein the heat transport elements are tubing containing a gas.

12. A cogeneration system comprising:

an electrochemical converter assembly having a plurality of columnar converter elements, each columnar element comprising a set of electrolyte plates having a fuel electrode material coated on one side and an oxidizer electrode material coated on the other side, and a set of interconnector plates to provide electrical contact with the electrode coatings of the electrolyte plates, as well as passages for the distribution of gases, wherein the columnar element is assembled by stacking alternating layers of electrolyte and interconnector plates and then joining said plates together at their peripheral edges to define a gas-tight assembly;

an inter-columnar heat transport assembly, having a plurality of integrated heat transport elements disposed between the elements of the converter assembly without contacting the converter elements to provide efficient temperature regulation by radiant heat transfer;

a fuel supply connected to the converter assembly to provide a source of fuel for electrochemical conversion;

means for extracting electricity from the converter assembly; and a steam circulation system to provide energy for at least one external process, the circulation system including means for delivering water or low energy steam to the heat transport assembly and means for extractng higher energy steam from the heat transport.

13. The system of claim 12 wherein partially spent fuel from the converter is consumed to generate further steam.

14. In an electrochemical-loop system containing a dissociative working medium, comprising an electrolytic cell a source of thermal energy providing energy to said electrolytic cell, and a fuel cell, wherein the electrolytic cell separates said working medium into its molecular components and said fuel cell generates electricity by recombination of said molecular components, the improvement to the electrolytic cell comprising:

an electrochemical converter assembly having a plurality of columnar converter elements, each columnar element comprising a set of solid oxide electrolyte plates having a fuel electrode material coated on one side and an oxidizer electrode material coated on the other side, and a set of interconnector plates to provide electrical contact with the electrode coatings of the electrolyte plates, as well as passages for the distribution of bases, wherein the columnar element is assembled by stacking alternating layers of electrolyte and interconnector plates and then joining said plates together at their peripheral edges to define a gas-tight assembly; and an inter-columnar heat transport assembly, having a plurality of heat-transferring elements and a working medium to transfer heat from one region of the converter assembly to another region of said converter assembly, the elements of the heat transport assembly being disposed between the elements of the converter assembly without contacting the converter elements to provide efficient temperature regulation and facilitate the removal or addition of thermal energy by radiant transfer.

15. The system of claim 14 wherein the working medium is $H_2O$ and the molecular components are $H_2$ and $O_2$.

16. The system of claim 14 wherein the working medium is $CO_2$ and the molecular components are $CO$ and $O_2$.

17. The system of claim 14 wherein the system further includes means for replenishing at least one of said molecular components 18. The system of claim 14 wherein the source of thermal energy is a nuclear reactor and said heat transport assembly of said electrolytic cell is thermally coupled to the reactor.

19. The system of claim 14 wherein the source of thermal energy is a concentrated solar collector and said heat transport assembly of said electrolytic cell is thermally coupled to the collector.

20. A method of regulating temperature in an electrochemical converter assembly having a plurality of columnar stacked-plate converter elements, the method comprising disposing a plurality of heat transport elements between said columnar converter elements to transport heat to or from said converter elements by radiative thermal coupling.

21. An interconnector plate for use in an electrochemical converter, the interconnector plate serving to provide electrical connection between an oxidizer electrode of a first electrolyte disposed on one side of the interconnector plate and a fuel electrode of a second electrolyte disposed on the other side of the interconnector plate, the plate also serving to isolate and distribute separate reactant gases over the oxidizer and fuel electrodes of the first and second electrolytes, the interconnector plate being forming from a material chosen from the group of iron-chromium-aluminum alloys, cermets of such alloys and molybdenum disilicide the thickness of the plate ranging from about 100 to about 500 microns in the case of alloys and cermets, and from about 50 to 300 microns in the case of molybdenum disilicide; the plate having a corrugated pattern of ridges and grooves on one side thereof to permit the isolation and distribution of a first reactant gas on the one side and a complementary corrugated pattern of ridges and grooves on the other side of the plate to permit the isolation and distribution of a second reactant gas on the other side; and holes for introduction of the first reactant gas onto the one side and for the introduction of the second reactant gas onto the other side.

* * * * *